United States Patent [19]

Lindberg

[11] Patent Number: 5,076,641
[45] Date of Patent: Dec. 31, 1991

[54] VEHICLE ARMREST

[75] Inventor: Kenneth M. Lindberg, Holland, Mich.

[73] Assignee: Prince Corporation, Holland, Mich.

[21] Appl. No.: 567,726

[22] Filed: Aug. 15, 1990

[51] Int. Cl.⁵ .................................................. A47C 7/62
[52] U.S. Cl. .................................. 297/194; 312/235.6; 49/193
[58] Field of Search ...................... 297/194; 312/235.6; 49/192, 193; 220/332

[56] References Cited

U.S. PATENT DOCUMENTS

| | | | |
|---|---|---|---|
| 300,441 | 6/1884 | Borst | 220/332 |
| 872,694 | 12/1907 | Thiem | 49/192 X |
| 3,048,898 | 8/1962 | Davis | 49/193 |
| 3,104,131 | 9/1963 | Krone | 312/235.6 X |
| 3,690,035 | 9/1972 | Schindlauer | 49/192 |
| 3,911,621 | 10/1975 | McHeffey | 49/192 |

Primary Examiner—Peter A. Aschenbrenner
Attorney, Agent, or Firm—Price, Heneveld, Cooper, DeWitt & Litton

[57] ABSTRACT

A vehicle armrest includes a storage compartment formed therein and having a cover which opens in two direections to increase accessibility to the inside of the compartment. A preferred embodiment includes an intermediate ring pivotally coupled to the cover and to the compartment and latches for allowing the cover and ring to pivot open in one direction and the cover to pivot open in another direction.

9 Claims, 2 Drawing Sheets

VEHICLE ARMREST

BACKGROUND OF THE DISCLOSURE

The present invention pertains to vehicle armrests and particularly an armrest with a storage compartment having a cover which opens in two orthogonal directions.

Recently and for a number of reasons, vehicles have generally become smaller and thus offer less space and more compact quarters. Along with the tighter space has come a loss of interior areas sufficient in size and location for placement of convenient storage compartments which are easily accessible. As a result, smaller, deeper, narrower, and more irregular containers are being offered which are difficult to access.

One area of a vehicle which has in recent years become a popular storage location is an armrest positioned between either the front seats or the rear passenger seats. Typically, storage-type armrests have a cover which is pivotally mounted to a base such that the armrest is opened rearwardly. Such construction is typified by U.S. Pat. No. 4,792,184 issued Dec. 20, 1988 and assigned to the present Assignee. A difficulty with such a storage armrest lies in the fact that access for the vehicle driver can be difficult if not awkward particularly when driving since it is necessary to lift the cover to a vertical rearward position for access.

SUMMARY OF THE PRESENT INVENTION

The present invention provides an armrest for a vehicle and one which includes a compartment having a cover which opens two ways thus increasing accessibility to the internal compartment. By opening two ways, such a cover permits the user to gain easy access to the storage compartment. In a preferred embodiment, the compartment cover opens both rearwardly as well as to one side. For such operation the cover includes orthogonally related pivot mounting and latching means. Further, the armrest system of the present invention is comprised of multiple pieces which facilitate manufacture and assembly.

These and other features, objects, and advantages of the present invention will become apparent upon reading the following detailed description of the preferred embodiment of the invention together with the accompanying drawings, in which:

DETAILED DESCRIPTION OF THE PREFERRED EMBODIMENT

Figure 1:
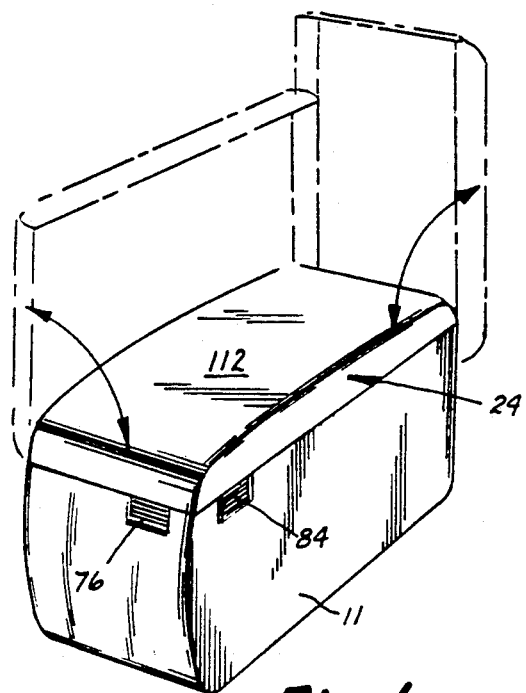
FIG. 1 is a perspective view of an armrest embodying the present invention.
Figure 3:
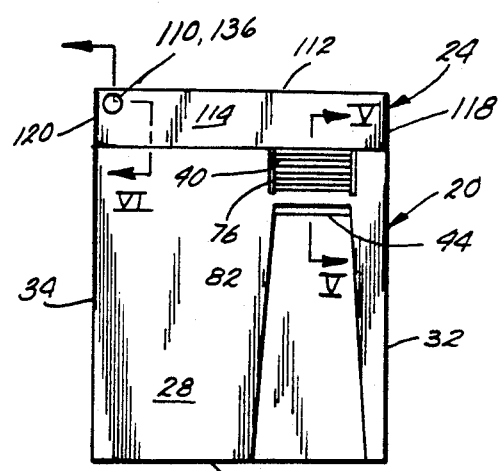
FIG. 3 is front elevational view of the armrest of FIG. 1.
Figure 4:
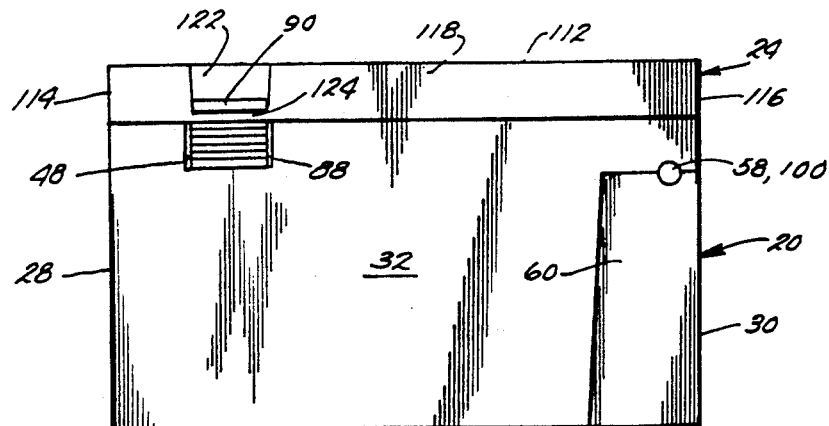
FIG. 4 is a left side elevational view of the armrest of FIG. 1.
Figure 2:
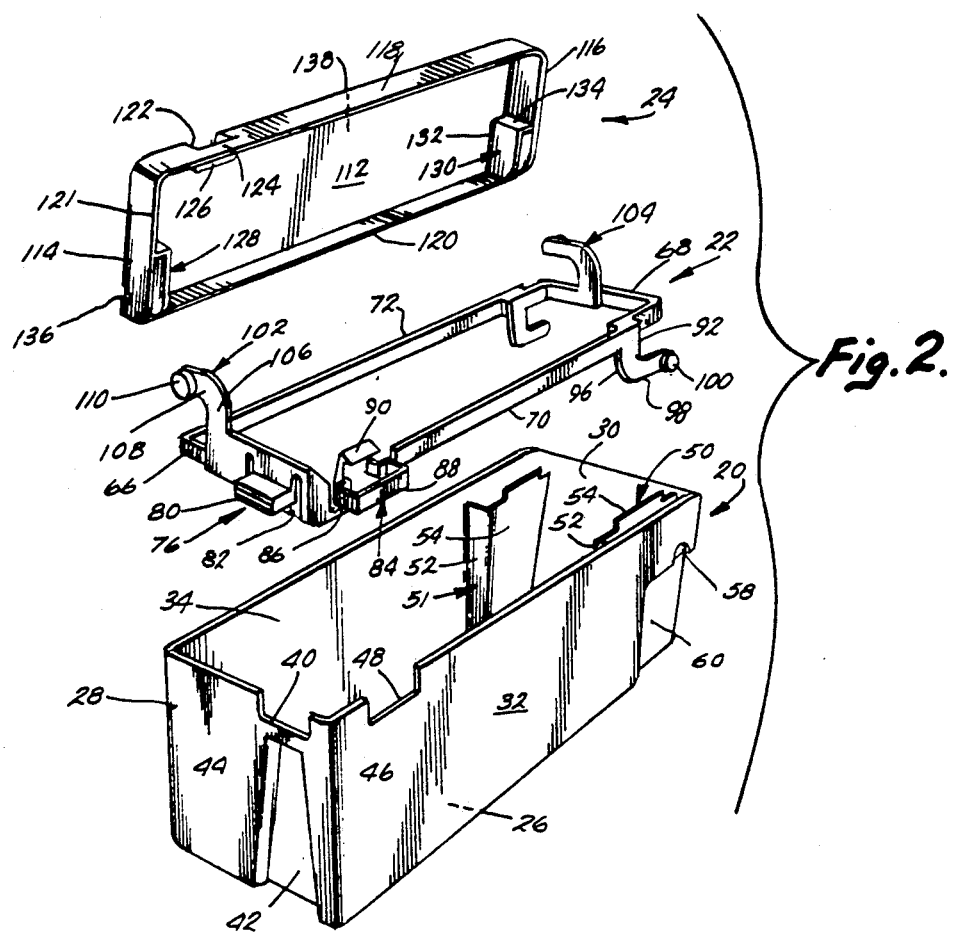
FIG. 2 is an exploded view of the storage compartment of the armrest shown in FIG. 1.

An armrest 10 having a compartment with a dual opening lid embodying the present invention is shown in FIGS. 1-4. The armrest is installed in a vehicle such as between the driver and front passenger seats, and is provided with a cover assembly that opens selectively sideways or rearwardly as best shown in FIG. 2. Armrest 10 is of three piece construction as best seen in FIG. 2 having a container base 20 which is integrated into the body 11 of the armrest, an intermediate ring 22, and a cover or lid 24. Container 20 is substantially a rectangularly box-shaped integrally formed member with an upwardly facing opening and having a bottom 26, a front wall 28, a rear wall 30, and sides 32 and 34, each of which are substantially flat surfaces. Members 28, 30, 32, and 34 form an upper rectangular perimeter 36. Container 20 can be integrally molded in place within the armrest body 11 by methods commonly known in the art. Also the container and its associated structure can be separately fastened within a recess in the armrest body using fastening screws or the like.

Figure 5:
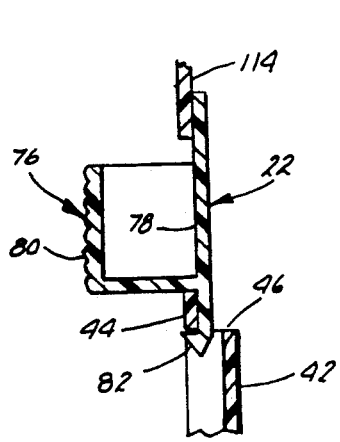
FIG. 5 is an enlarged cross-sectional view taken along section line V—V of FIG. 3.

As shown in FIG. 2, the upper rim or perimeter of container 20 includes a rectangular notch 40 located on the upper edge of container front 28. Located directly below notch 40 is a tapered recess 42 which extends to container bottom 26. A locking ledge 44 is formed between notch 40 and recess 42 thus forming a rectangular locking opening 46 formed immediately inside therefrom as best seen in FIG. 5. Container side 32 also has a rectangular notch 48 similar in size to notch 40 and located near the front wall 28 such that a person such as a vehicle driver setting with his or her arm and hand resting upon armrest 10 has their thumb and first finger near to the notches 48 and 40 respectively.

Located at the rear of container 20 are hinge pockets 50 and 51 which are mirror images of each other. Pocket 50 (and 51) is comprised of two walls 54 and 56 which form a rectangular box-shaped structure against side 32 and rear 30 with an upwardly facing opening. A hinge pivot hole 58 is located on container side 32 near container rear wall 30 and located about midway in a vertical direction. A recess 60 is formed in opposite rear corners of the container sides 32 and 34 and extends downwardly from hole 58 below pocket 50 to facilitate molding of the container 20. The intermediate ring 22 which couples the cover 24 to the container 20 will now be described.

The integrally molded ring 22 includes a front wall 66, ring wall 68, and sides 70 and 72 which form a rectangular ring substantially similar to but slightly smaller than perimeter 36 of container 20. Ring 22, in its installed position sets partially within and below perimeter 36 of container 20. Located on ring front 66 is a finger actuated front latch 76 which is mounted on a flexible hinge 78 and is comprised of finger tab 80 and downwardly extending hook 82 (FIG. 5). In its installed position, tab 80 mateably sets within notch 40 and hook 82 mateably slips within recess 42 a sufficient distance to allow hook 82 to engage locking ledge 44. A second side latch 84, is located on ring side 70 and is similar to first latch 76, but is inverted 180 degrees. Latch 84 also includes a living or flexible hinge 86, a thumb tab 88, and an upwardly extending hook 90. Tab 88 fits mateably within rectangular notch 48 when the ring is assembled to the container 20.

Located on sides 70, 72 near ring end 68, are a pair of downwardly curved hinge arms 92 and 94 which are mirror images of each other. Arm 92 has a downwardly extending portion 96 and rearwardly extending portion 98 with disk-shaped stub axle 100 located on the outward side of the end portion 98. Arms 92 and 94 are suitably shaped to slip within pockets 50 and 51 respectively with their axles 100 extending into hinge pivot holes 58. Walls 54 are positioned such that arms 92 and 94 are held outwardly and thus axles 100 forcibly held within hinge pivot holes 58. Further, arm extensions 98 extend rearwardly a sufficient distance such that, when cover 24 (and ring 22) are opened rearwardly, arm portions 96 and ring rear 68 do not strike container rear wall 30 at perimeter 36. Similarly arm 94 fits into its associated pocket 51.

Ring 22 also has a second set of curved hinge arms 102 and 104 similar to arms 92 and 94 but extending upwardly and sidewardly. Arm 102 is located on ring front wall 66 adjacent latch 76 and near side 72. Arm 104 is similarly situated on ring rear wall 68. Arm 102 and 104 are mirror images and have an upwardly extending portion 106 and sidewardly extending portion 108 ending with a outwardly extending stub axle 110. Arms 102 and 104 fit mateably into pockets 128 and 130 in cover 24 with apertures for the stub axles 100 similar to the manner arms 92 and 94 fit into pockets 50 and 51 in container 20. Cover 24 will now be described.

Figure 6:
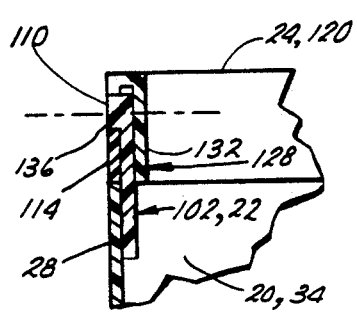
FIG. 6 is an enlarged cross-sectional view taken along section line VI—VI of FIG. 3.

The cover 24 is integrally molded and is a substantially a shallow mirror-image of container 20 which is in an inverted position. Cover 24 is substantially a shallow box-like rectangular structure having a substantially flat top 112, front 114, rear 116, and sides 118 and 120. The lower edge of front 114, rear 116, and sides 118 and 120 form a perimeter 121 which can abut container perimeter 36 as shown, or slightly overlap and engage perimeter 36 as is commonly known in the art. Located on side 118 is a tapered recess 122 which forms locking ledge 124 and locking opening 126 similar to recess 42, ledge 44, and opening 46 of container 20. Ledge 124 and opening 126 are positioned to cooperate with hook 90 of latch 84. Cover 24 also has pockets 128 and 130 located on the front 114 and rear 116 near side 120. Pockets 128 and 130 are mirror images of one another and shaped similarly to pockets 50 and 51 in container 20, but each include walls 132 and 134 which form a downwardly facing opening. Each pocket also includes a hinge pivot aperture 136 which is located on the front 114 and the rear 116 close to the top 112 and side 120. Pockets 128 and 130 mate with hinge arms 102 and 104 (FIG. 6) such that at each location axle 110 is held within pivot aperture 136 by wall 132. Also, pockets 128 and 130 are suitably sized such that arms 102 and 104 fit within pockets 128 and 130 when cover 24 is in a fully closed position.

Cover 24 can be upholstered using a cushion and upholstery material secured to the upper surface and sides of top 112 to provide a comfortable and attractive armrest. Further the container interior can be flocked or otherwise treated. Having described the various parts of the armrest, the operation of this invention is now briefly described.

Figure 7:
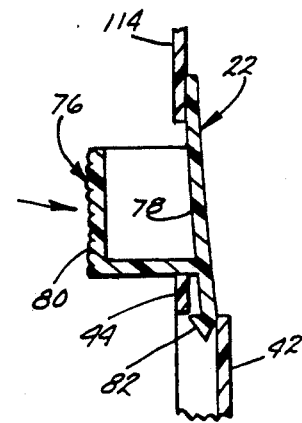
FIG. 7 is the same cross-sectional view as seen in FIG. 5 but showing the lower latch depressed for opening the cover.

The armrest 10 will typically be mounted in a vehicle such that it extends beside the driver and front passenger seats such that an operator rest his or her arm comfortably on the upper surface of cover 24 with their hand extending forwardly overhanging the frontal area of compartment 20. In this position, the driver's thumb is adjacent side latch 84 and the fingers are adjacent front latch 76. By simply pressing latch 76 and pulling upwardly and rearwardly, hook 82 is disengaged from ledge 44 (FIG. 7) allowing cover 24 and ring 22 to swing upwardly and rearwardly as a single unit about a rear axis located at axles 100 and apertures 58. Arms 94 and 98 swing relatively freely within pockets 50 and 51. Further, axles 100 are securely held in place within apertures 58 by walls 54. Cover 24 is closed by reversing the above operation whereupon latch 76 slips within recess 42, and hook 82 extends past and then engages ledge 44. Tab 80 fits within notch 40 in the closed position. Hook 82 can have an angled lower surface to help ramp hook 82 past ledge 44 as cover 24 is closed.

Similarly, the driver or passenger can open cover 24 sideways by pressing latch 84 with a thumb and pulling upwardly and sidewardly with his or her fingers. This disengages hook 90 from ledge 124 allowing cover 24 (not including ring 22) to swing upwardly and sidewardly about a side axis located at axles 110 and apertures 136. Arms 102 and 104 swing relatively freely within pockets 128 and 130. Further, axles 110 are securely held in place within apertures 136 by walls 132. Cover 24 is closed by reversing the above operation.

It is to be understood that container 20 with its dual opening cover defined by ring 22 and cover 24 could be installed elsewhere in a vehicle as desired and that even though two axis are shown, more axis, of construction similar to that disclosed, could be added to extend the flexibility of the storage system.

Thus, it is seen with the compartment of the present invention, a highly accessible and convenient storage system is provided for storing personal items in a vehicle. The storage device is accessible by opening the cover in the most convenient and efficient manner. In the preferred embodiment, the system is shaped and adapted to be easily unlatched and opened with minimal hand movement and arm motion. In the preferred embodiment of the invention each of the constituent elements of the assembly were integrally molded of a suitable polymeric material such as ABS, polypropylene or the like to provide ease of assembly by snap fitting the intermediate member to the container and then the cover to the intermediate member.

It will become apparent to those skilled in the art that various modifications the preferred embodiment of the invention can be made without departing from the spirit or scope thereof as defined by the appended claims.

The embodiments of the invention in which an exclusive property or privilege is claimed are defined as follows:

1. An armrest for use in a vehicle comprising:
   an armrest body;
   a container mounted in said armrest body and defining an interior compartment with an upwardly facing opening;
   cover means for said opening, said cover means including a cover member and an intermediate member mateably positioned between said container and said cover member, said cover means including first and second pivot means for pivotally mounting said cover means for movement about first and second generally orthogonally aligned axes to access said interior compartment by selectively pivoting said cover member along either one of said axes, said first and second pivot means being located adjacent the space defined by said interior compartment; and latch means extending between said cover means and said container for releasably latching said cover means in a container covering position, wherein said container includes four sides and a first pair of spaced apertures formed in a first pair of opposite sides for receiving said first pivot means.

2. The apparatus as defined in claim 1 wherein said intermediate member includes a generally rectangular frame and said first pivot means comprises a first pair of arms having axle means for extending into said first pair of apertures for mounting said intermediate member to said container to pivot said cover means along a first axis.

3. The apparatus as defined in claim 2 wherein said cover member includes four sides corresponding to said four sides of said container, and said cover member further includes a second pair of spaced apertures formed in a second pair of opposite sides for receiving said second pivot means, said second pair of opposite sides of said cover member being located orthogonally to said first pair of opposite sides of said container.

4. The apparatus as defined in claim 3 wherein said second pivot means comprises a second pair of spaced arms having axle means extending therefrom for extending into said second pair of spaced apertures for mounting said intermediate member to said cover to pivot said cover means along said second axis.

5. The apparatus as defined in claim 4 wherein said latch means comprises a first latch extending between said intermediate member and said container and a second latch extending between said intermediate member and said cover member.

6. The apparatus as defined in claim 5 wherein each of said cover member, said intermediate member and said container are integrally molded of a polymeric material.

7. The apparatus defined in claim 6 wherein said cover member, said container, and said intermediate member snap together for assembly.

8. An armrest for use in a vehicle comprising:
an armrest body;
a container mounted in said armrest body and defining an interior compartment with an upwardly facing opening;
cover means for said opening, said cover means including first and second pivot means for pivotally mounting said cover means for movement about first and second generally orthogonally aligned axes to access said interior compartment by selectively pivoting said cover along either one of said axes, said first and second pivot means being located adjacent the spaced defined by said interior compartment; and
latch means extending between said cover means and said container for releasably latching said cover means in a container covering position, wherein said cover member forms the top of said armrest and has a cushioned upper surface.

9. An armrest for a vehicle comprising:
an armrest body including a container formed therein;
a ring-like member pivotally mounted to said container for movement along a first axis;
a cover pivotally mounted to said ring-like member for movement along a second axis; and
latch means permitting either said cover to be pivoted for gaining access to said compartment from a first direction or for permitting said cover and ring-like member to both pivot for gaining access to said compartment from a second direction.

* * * * *